US012737095B2

(12) United States Patent
Watanabe

(10) Patent No.: US 12,737,095 B2
(45) Date of Patent: Sep. 15, 2026

(54) INFORMATION PROCESSING DEVICE AND PROGRAM

(71) Applicant: FUJIFILM CORPORATION, Tokyo (JP)

(72) Inventor: Tetsuya Watanabe, Kanagawa (JP)

(73) Assignee: FUJIFILM CORPORATION, Tokyo (JP)

(*) Notice: Subject to any disclaimer, the term of this patent is extended or adjusted under 35 U.S.C. 154(b) by 213 days.

(21) Appl. No.: 18/689,079

(22) PCT Filed: Aug. 12, 2022

(86) PCT No.: PCT/JP2022/030794
§ 371 (c)(1),
(2) Date: Mar. 5, 2024

(87) PCT Pub. No.: WO2023/047838
PCT Pub. Date: Mar. 30, 2023

(65) Prior Publication Data

US 2024/0377924 A1 Nov. 14, 2024

(30) Foreign Application Priority Data

Sep. 21, 2021 (JP) ................................ 2021-153035

(51) Int. Cl.
*G06F 3/0482* (2013.01)

(52) U.S. Cl.
CPC ................................ *G06F 3/0482* (2013.01)

(58) Field of Classification Search
CPC ................................................ G06F 3/048–05
See application file for complete search history.

(56) References Cited

U.S. PATENT DOCUMENTS

| | | | | |
|---|---|---|---|---|
| 6,208,879 | B1 * | 3/2001 | Iwata | H04M 1/2747 715/744 |
| 6,636,244 | B1 * | 10/2003 | Kelley | G06F 3/04842 715/788 |
| 9,678,625 | B2 * | 6/2017 | Nakayama | G11B 19/025 |
| 2003/0212659 | A1 | 11/2003 | Ban | |

(Continued)

FOREIGN PATENT DOCUMENTS

| | | | |
|---|---|---|---|
| JP | 2003-76478 | A | 3/2003 |
| JP | 2012-123475 | A | 6/2012 |

(Continued)

*Primary Examiner* — Daniel Rodriguez
(74) *Attorney, Agent, or Firm* — SOLARIS Intellectual Property Group, PLLC

(57) ABSTRACT

Provided is an information processing device, including: a processor, wherein the processor is configured to: display a plurality of first indices of a database stored in a storage unit, in a first direction of a display area of a display unit; display, upon detecting a user's selection operation for a first index, a plurality of second indices, corresponding to the first index, in a straight line in a second direction intersecting or parallel to the first index; and determine that a second index is selected in a case in which it is detected that a second index display area displaying the second index has been selected, and also in a case in which it is detected that a selection area set other than the second index display area has been selected.

14 Claims, 13 Drawing Sheets

(56) References Cited

U.S. PATENT DOCUMENTS

| | | | | |
|---|---|---|---|---|
| 2004/0056837 | A1* | 3/2004 | Koga | G06F 1/16 345/156 |
| 2006/0036942 | A1* | 2/2006 | Carter | G06F 3/0485 715/273 |
| 2006/0112347 | A1* | 5/2006 | Baudisch | G06F 3/0481 715/764 |
| 2009/0228837 | A1* | 9/2009 | Suzuki | B60K 35/10 715/841 |
| 2010/0283746 | A1* | 11/2010 | Vuong | G06F 3/0482 345/173 |
| 2010/0298034 | A1* | 11/2010 | Shin | H04M 1/2748 707/769 |
| 2012/0162242 | A1* | 6/2012 | Amano | G06F 3/0482 345/592 |
| 2014/0059482 | A1* | 2/2014 | Won | G06F 3/0485 715/787 |
| 2015/0227173 | A1* | 8/2015 | Hwang | G06F 1/1652 345/619 |
| 2015/0234938 | A1* | 8/2015 | Zhang | G06Q 10/107 707/753 |
| 2015/0355813 | A1* | 12/2015 | Hughes | G06F 3/0484 715/771 |
| 2016/0070425 | A1* | 3/2016 | Song | G06F 16/2428 715/834 |
| 2016/0170630 | A1* | 6/2016 | Park | G06F 3/0482 345/661 |
| 2017/0277368 | A1* | 9/2017 | Toda | G06F 7/08 |
| 2020/0293620 | A1* | 9/2020 | Sato | G06F 40/30 |

FOREIGN PATENT DOCUMENTS

| | | | |
|---|---|---|---|
| JP | 2012-247833 | A | 12/2012 |
| JP | 2013-88833 | A | 5/2013 |

* cited by examiner

FIG. 1

INFORMATION PROCESSING DEVICE AND PROGRAM

TECHNICAL FIELD

The present disclosure relates to an information processing device and a program.

BACKGROUND ART

Japanese Patent Application Laid-Open (JP-A) No. 2013-88833 discloses an information processing device including: a storage unit configured to store a database; a display unit configured to provide with a list display area where a list of data registered in the database is displayed and an index display area where an index of the database is displayed; an operation unit configured to receive a user's operation; and a control unit configured to display a partial list of data registered in the database in the list display area and display the index in the index display area, and when receiving a selection operation for any index displayed in the index display area, display a list of data corresponding to the selected index in the list display area, wherein the control unit is configured not to display an index corresponding to data not registered in the database in the index display area among preset indices.

SUMMARY OF INVENTION

Technical Problem

There is a method of displaying an index of data registered in a database in a display area of a display unit and allowing a user to access the data via selection of the index. Since a space where the index can be displayed is limited, another method is proposed in which a second index is displayed based on a first index after the first index is selected. To select such a second index, it is necessary to select a desired second index by moving a selected location along a display direction of the second index in the state where the first index is selected. However, when the selected location is outside of a display range of the second index, a user has to select the first index again.

An object of the present disclosure is to provide an information processing device and a program, each of which is capable of selecting, even if a selected location is outside of a display range of the second index, the second index without having to select the first index again.

Solution to Problem

An information processing device according to a first aspect of the present invention includes a processor, wherein the processor is configured to: display first indices of a database stored in a storage unit, in a first direction of a display area of a display unit;

display, upon detecting a user's selection operation for a first index, second indices, corresponding to the first index, in a straight line in a second direction intersecting or parallel to the first index; and determine that a second index is selected in a case in which it is detected that a second index display area displaying the second index has been selected, and also in a case in which it is detected that a selection area set other than the second index display area has been selected.

In the information processing device according to a second aspect of the invention, the processor is further configured to provide the selection area for each of the second indices.

In the information processing device according to a third aspect of the invention, the processor is further configured to determine that, in a case in which a divided selection area has been selected, the second index corresponding to the divided selection area is selected, the divided selection area being an area into which the selection area is divided in a direction intersecting the second direction for each of the second indices.

In the information processing device according to a fourth aspect of the invention, selection for second indices at both ends among the plurality of second indices enables detection of an area up to ends of display areas facing divided selection areas corresponding to other adjacent second indices as corresponding divided selection areas.

In the information processing device according to a fifth aspect of the invention, the processor is further configured to display the second indices in a predetermined order starting from a first index side.

In the information processing device according to a sixth aspect of the invention, the processor is further configured to select whether to display the first index at a right end of the display area and display the second indices to the left of the first index, or alternatively, display the first index at a left end of the display area and display the second indices to the right of the first index.

In the information processing device according to a seventh aspect of the invention, the processor is further configured to determine that, even before the second index is displayed, the second index is selected in a case in which the second index display area, in which the second index is to be displayed, is selected.

In the information processing device according to an eighth aspect of the invention, the processor is further configured to display the second index in a case in which a predetermined condition is satisfied.

In the information processing device according to a ninth aspect of the invention, the predetermined condition is that selection of one of the first indices is held for a predetermined time.

In the information processing device according to a tenth aspect of the invention, the predetermined condition is selecting one of the first indices and then sliding to the second index display area in which the second indices are displayed.

In the information processing device according to an eleventh aspect of the invention, the processor is further configured to display, in a case in which another first index is selected after the second indices are displayed, second indices corresponding to the other first index regardless of the predetermined condition.

In the information processing device according to a twelfth aspect of the invention, the processor is further configured to:

display a third index associated with the second index in any one or both of directions intersecting the second direction of the second index in a state in which the second index is selected.

In the information processing device according to a thirteenth aspect of the invention, the processor is further configured to display a third index associated with the second index in any one or both of directions intersecting the second direction of the second index in a case in which selection of the second index is held for a predetermined time.

In the information processing device according to a fourteenth aspect of the invention, the database is an address book in which destination information is registered.

In the information processing device according to a fifteenth aspect of the invention, the first index is a character in a sequence "A" of the Japanese syllabary chart, and the second index is a character in a row of the Japanese syllabary chart, corresponding to the character previously selected from the sequence "A".

A program according to a sixteenth aspect of the invention is a program causing a computer to execute processing, the processing comprising: displaying first indices of a database stored in a storage unit, in a first direction of a display area of a display unit; displaying, upon detecting a user's selection operation for a first index, second indices, corresponding to the first index, in a straight line in a second direction intersecting or parallel to the first index; and determining that a second index is selected in a case in which it is detected that a second index display area displaying the second index has been selected, and also in a case in which it is detected that a selection area set other than the second index display area has been selected.

Advantageous Effects of Invention

According to the first aspect, even if a selected location is outside of a display range of the second index, the second index can be selected without having to select the first index again.

According to the second aspect, the second index can be selected by selecting the selection area provided for each second index.

According to the third aspect, the second index can be selected by selecting selection areas above and below the second index display area.

According to the fourth aspect, the selection of the second index can be detected over the display area of the display unit as compared with a case where the selection of the second index is detected only in the second index display area in the first direction.

According to the fifth aspect, as compared with a case where the second index is displayed from the opposite side of the selected first index, a moving distance from the selected first index to the second index to be selected can be shortened.

According to the sixth aspect, display locations of the first index and the second index can be changed.

According to the seventh aspect, the second index can be more quickly selected as compared with a case where the second index can be selected only after the second index is displayed.

According to the eighth aspect, the second index can be prevented from being displayed only by that the first index has been selected.

According to the ninth aspect, it is possible to perform setting such that a user is required to perform a predetermined operation in order to display the second index.

According to the tenth aspect, it is possible to set so that a user is required to perform a predetermined operation in order to display the second index.

According to the eleventh aspect, the second index can be displayed without waiting until the predetermined condition for displaying the second index is satisfied.

According to the twelfth aspect, data desired by the user can be accessed rather than accessing the data via the second index.

According to the thirteenth aspect, it is possible to prevent the third index not intended by the user from being displayed, in contrast to a case where it is not required that the selection of the second index is held for the predetermined time.

According to the fourteenth aspect, even if a selected location is outside of a display range of the destination of the second index, the destination of the second index can be selected without having to select the destination of the first index again.

According to the fifteenth aspect, even if a selected location is outside of a display range of the row in the Japanese syllabary chart, the row in the Japanese syllabary chart can be selected without having to select the index from the sequence "A" in the Japanese syllabary chart again.

According to the sixteenth aspect, it is possible to provide a program capable of selecting, even if a selected location is outside of a display range of the second index, the second index without having to select the first index again.

BRIEF DESCRIPTION OF DRAWINGS

FIG. 1 shows a schematic block diagram of an image forming device according to an embodiment.

DESCRIPTION OF EMBODIMENTS

Embodiment

Figure 2:
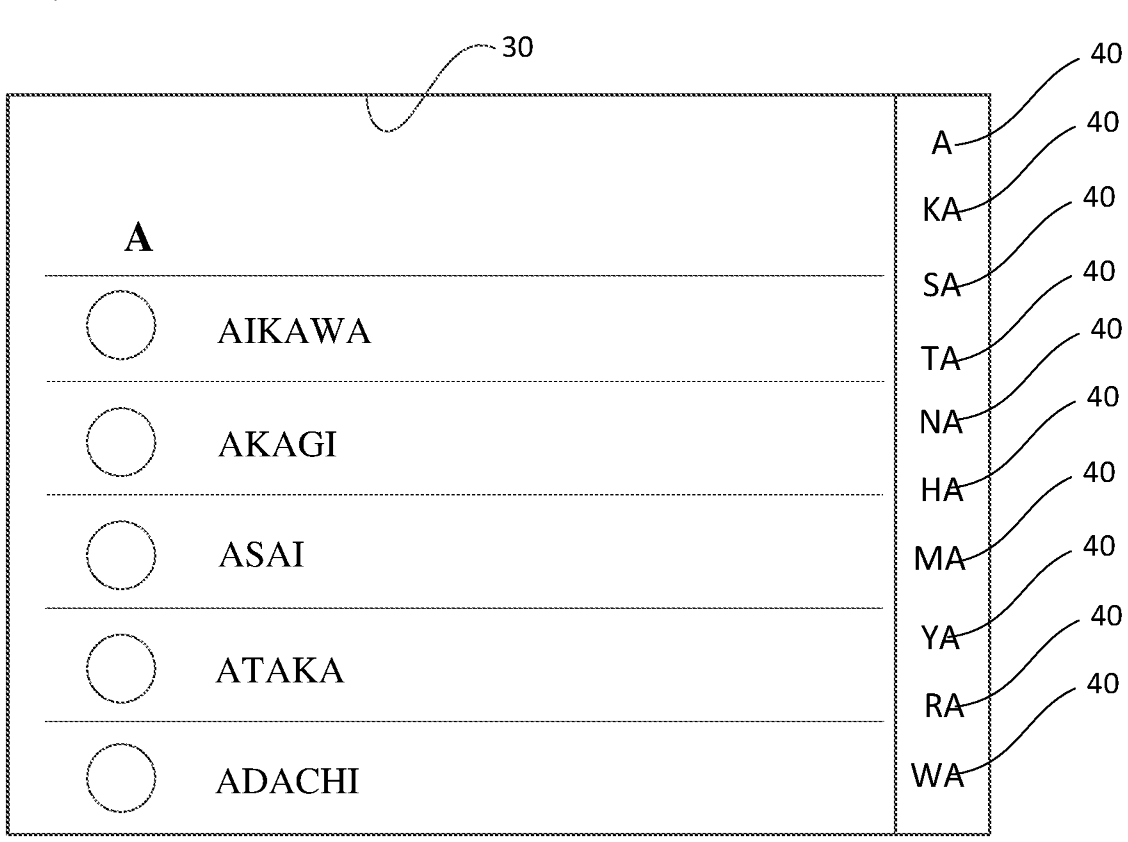
FIG. 2 shows a diagram illustrating one example of display on a display unit of the image forming device according to the embodiment.

One example of an embodiment of the disclosure will be described below with reference to the drawings. In the drawings, the same or equivalent components and portions are denoted by the same reference numerals. Furthermore, dimensional ratios in the drawings are exaggerated for better understanding and may differ from the actual ratios.

Figure 1:
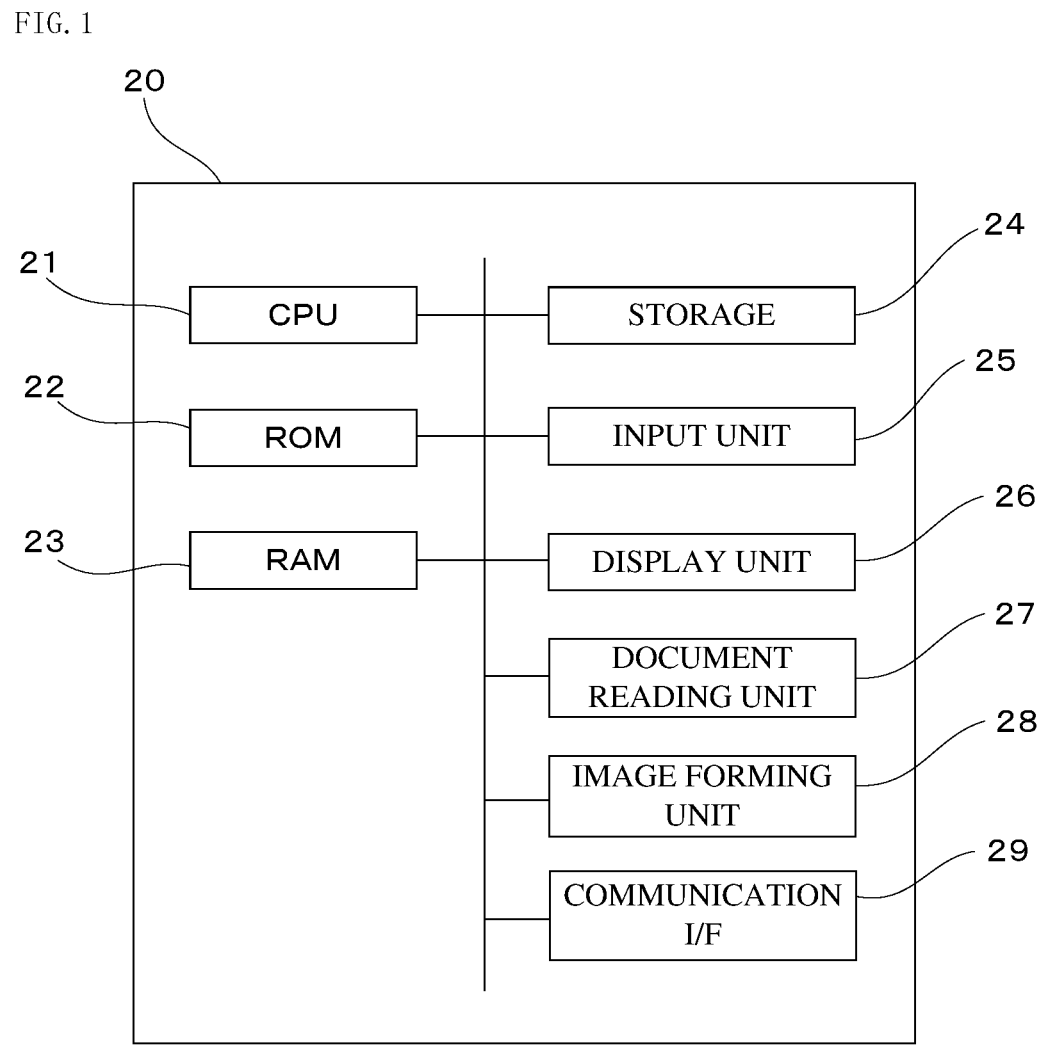

FIG. 1 is a block diagram illustrating a hardware configuration of an image forming device 20 which is one example of the information processing device according to the present embodiment. The image forming device 20 has functions of, for example, printout, photocopy and facsimile (FAX). One example of the information processing device is not limited to the image forming device. For example, it may be a telephone, facsimile machine or smartphone.

As illustrated in FIG. 1, the image forming device 20 includes a CPU 21 (one example of a processor), a ROM 22, a RAM 23, a storage 24, an input unit 25, a display unit 26, a document reading unit 27, an image forming unit 28, and a communication I/F 29. The respective components are communicatively connected to each other via a bus.

The CPU 21 is a central processing unit, and executes various programs and controls each unit. That is, the CPU 21 reads a program from the ROM 22 or the storage 24, and executes the program using the RAM 23 as a work area. The CPU 21 performs control of each of the components above and various types of arithmetic processing according to the program recorded in the ROM 22 or the storage 24. In the present embodiment, the program is stored in the ROM 22 or the storage 24.

The ROM 22 stores various programs and various data. The RAM 23 serves as a work area and temporarily stores programs or data. The storage 24 includes, for example, an HDD or an SSD, and stores various programs including an operating system and various data.

In the present embodiment, an address book in which destination information is registered is stored in the storage 24. The destination information includes, for example, a destination, telephone number and a FAX number for each destination, email address, and control number of a folder in the storage 24 for storing data captured using a scanner function of the image forming device 20. An initial letter of a name registered as a destination when a telephone number is enrolled in the address book serves as an index (first index 40, second index 50, and third index 60) which is a heading of the address book. The address book is one example of the database. However, one example of the database is not limited to the address book.

The input unit 25 includes a pointing device such as a mouse and a keyboard, and is used to perform various inputs. The input unit 25 is used, for example, when selecting any destination from the address book. In the present embodiment, the display unit 26, which is a touchscreen, functions as the input unit 25.

The display unit 26 is, for example, a liquid crystal display. The display unit 26 displays various types of information under the control of the CPU 21. Furthermore, the display unit 26 also functions as the input unit 25 as it is a touchscreen.

The document reading unit 27 receives documents one by one placed on a paper feed tray of an automatic feeder (not illustrated) provided in an upper portion of the image forming device 20, and optically scans the received documents to obtain image information. Alternatively, the document reading unit 27 optically reads a document placed on a scanning glass and obtains image information.

The image information of the document scanned by the document reading unit 27 is printed by the image forming unit 28 to be described later or transmitted to another image forming device having a facsimile function by the communication I/F 29 to be described later.

The image forming unit 28 forms, in other words, prints, an image based on the image information obtained by scanning by the document reading unit 27 on a recording medium such as paper.

The communication I/F 29 has a function of connecting the image forming device 20 to a public line and transmitting/receiving the image information obtained by scanning by the document reading unit 27 to/from another image forming device having a facsimile function.

Display of the address book and the operation for the index of the present embodiment will be described with reference to FIGS. 2 to 9.

FIG. 2 is one example of display of an initial screen in a case where the CPU 21 of the image forming device 20 displays the address book on the display unit 26.

As illustrated in FIG. 2, plural first indices 40 are vertically displayed at the right end of a display area 30 of the display unit 26. A vertical direction is one example of the first direction. In the present embodiment, the first indices 40 are characters on a sequence "A" in the Japanese syllabary chart. As illustrated in FIG. 2, the plurality of first indices 40, "A", "KA", "SA", "TA", "NA", "HA", "MA", "YA", "RA" and "WA" are displayed. Destination information registered in the address book is displayed in the order of Japanese syllabary in the display area 30 of the display unit 26. In a case where there is the first index 40 that is not registered among the first indices 40 in the address book, such a first index may not be displayed. For example, in a case where the destination information corresponding to a sequence "NA", that is, the destination information starting from "NA", "NI", "NU", "NE" or "NO" is not registered in the address book, "NA" may not be displayed as the first index 40.

Figure 3:
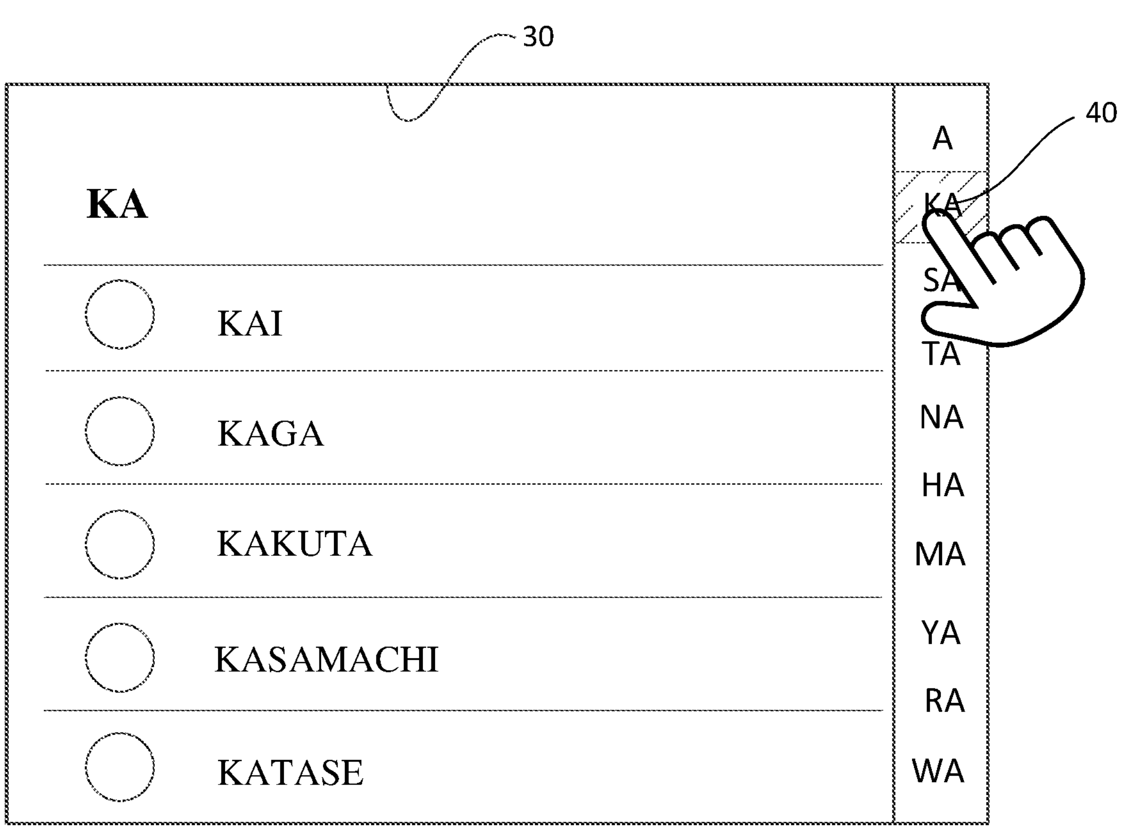
FIG. 3 shows a diagram illustrating one example of display subsequent to FIG. 2 on the display unit of the image forming device according to the embodiment.

FIG. 3 is one display example in a case where the user selects "KA" among the first indices 40 in the state shown in FIG. 2, that is, touches with a fingertip. A location touched by a fingertip is indicated by hatching in all the drawings. The first index 40 which is selected among the first indices 40 is determined by coordinates on a vertical axis of the display area 30 of the display unit 26.

Figure 4:
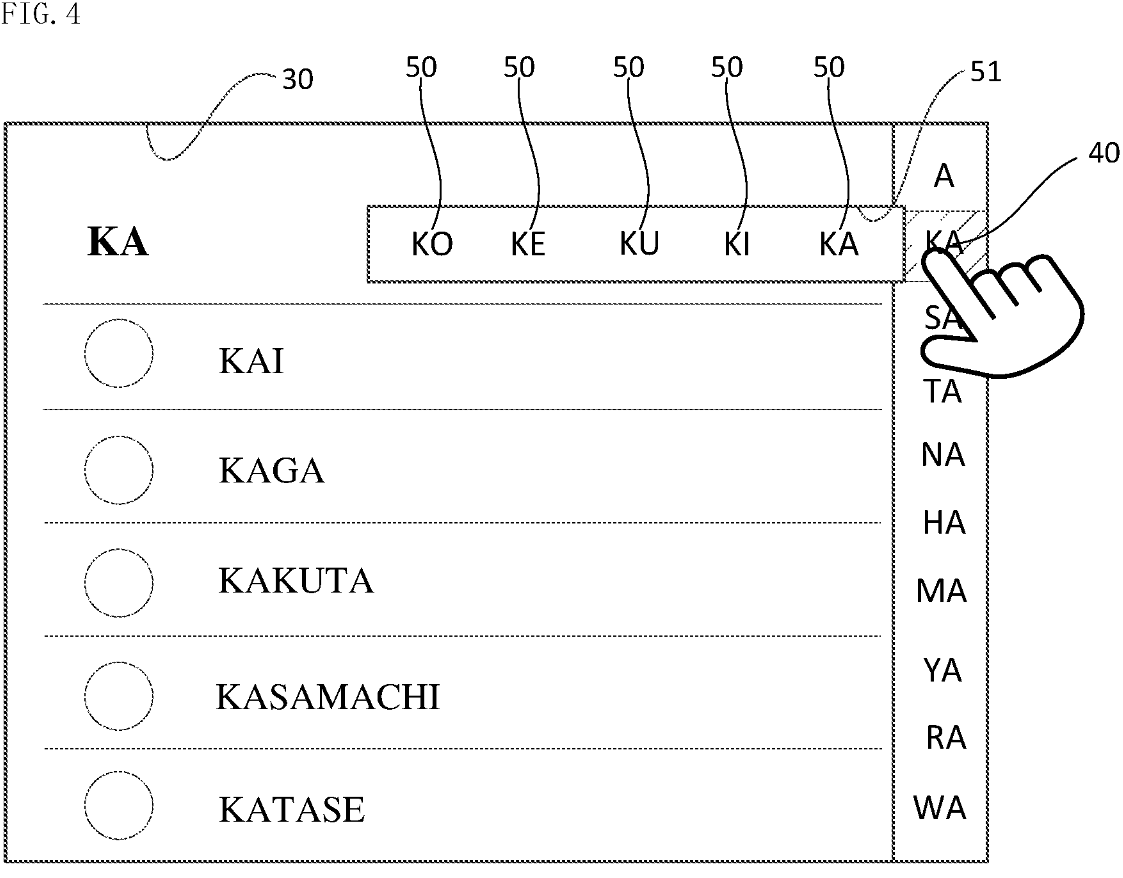
FIG. 4 shows a diagram illustrating one example of display subsequent to FIG. 3 on the display unit of the image forming device according to the embodiment.

As illustrated in FIG. 3, since "KA" is selected as the first index 40, information of destinations starting from "KA" is displayed in the display area 30 of the display unit 26. The second index 50 is then displayed by satisfying a predetermined condition. Indices that cannot be displayed as the first indices 40 are displayed as the second indices. The predetermined condition herein is that, for example, selection of one of the first indices 40 is held for a predetermined time, that is, long press. Specifically, when the user holds the selection of "KA" as the first index 40 for the predetermined time, that is, long-presses "KA", the second indices 50 corresponding to the first index 40 "KA", are displayed in a straight line in a left direction intersecting the first index 40 "KA" as illustrated in FIG. 4. The user's long press can prevent other second indices 50 from being unintentionally displayed. Furthermore, this configuration does not impair visibility of the destination information which would have been hidden behind the second indices 50 if the second indices 50 had been displayed before long press. The left direction is one example of the second direction. In the present embodiment, the second indices 50 are characters in a row of the Japanese syllabary chart corresponding to characters in the sequence "A", one example of the first index 40. As illustrated in FIG. 4, in a case where the first index 40 is "KA", the second indices 50 displayed are "KA", "KI", "KU", "KE" and "KO", characters belonging to the sequence "KA". The second indices 50 are displayed in a predetermined order from a side of the first index 40. That is, the characters are displayed in the order of “KA”, “KI”, “KU”, “KE” and “KO”, which is the order of characters in the sequence “KA”, from the right side (the side of the first index 40) to the left side. In a case where there is the second index 50 that is not registered among the second indices 50 in the address book, such a second index may not be displayed. For example, in a case where the destination information starting from “KU” is not registered in the address book, “KU” may not be displayed as the second index 50. In the present embodiment, the same index as the selected first index 40 (“KA” in the example shown in FIG. 4) is also displayed as the second index 50, however the invention is not limited thereto. For example, the same index as the first index 40 (“KA” in the example shown in FIG. 4) may not be displayed as the second index 50, and only the second indices 50 displayed may be “KI”, “KU”, “KE” and “KO”, except for “KA”.

Figure 5:
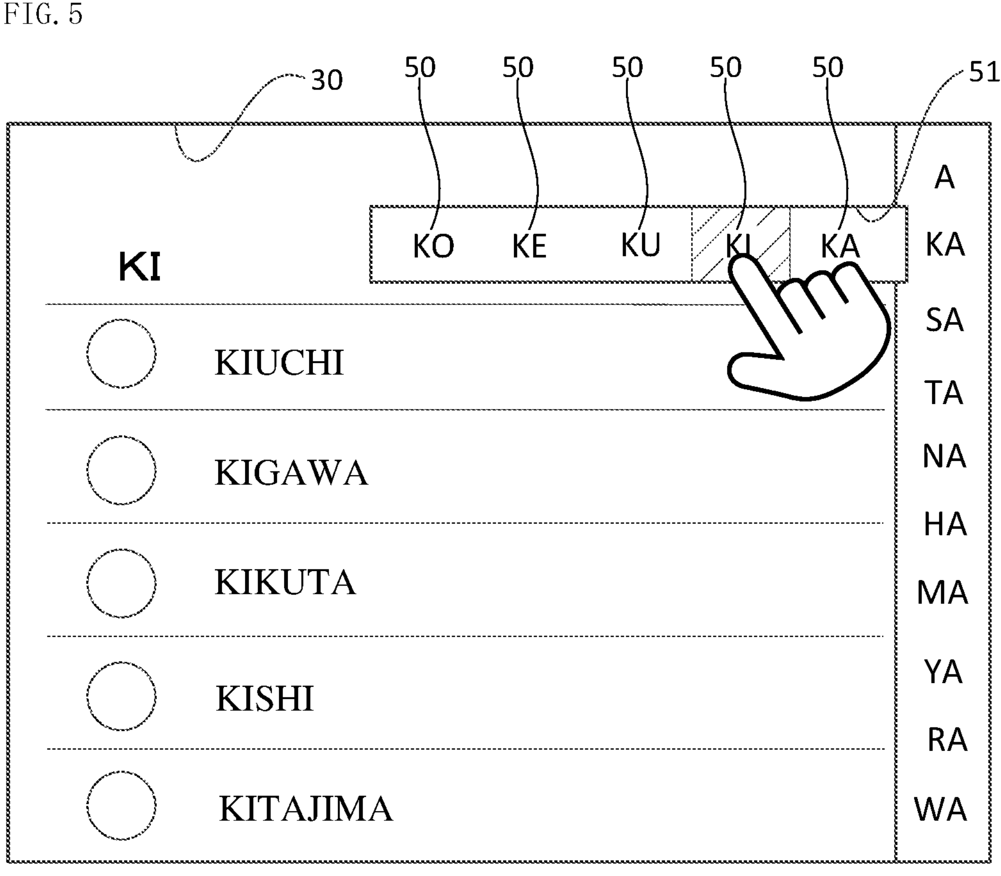
FIG. 5 shows a diagram illustrating one example of display subsequent to FIG. 4 on the display unit of the image forming device according to the embodiment.

FIG. 5 is one example of display in a case where the user slides the finger touching the display unit 26 in the left direction in which the second indices 50 are displayed for the selected first index 40 “KA” as shown in FIG. 4, and selects a second index display area 51 in which “KI” is displayed among the second indices 50. That is, by selecting the second index display area 51 in which each second index 50 is displayed, the second index 40 corresponding to the second index display area 51 is selected. Therefore, among the destination information registered in the address book, the destination information starting from “KI” is displayed in the display area 30 of the display unit 26. The second index 50 which is selected among the second indices 50 is determined by coordinates on a horizontal axis of the display area 30 of the display unit 26.

The CPU 21 of the image forming device 20 determines that the second index 50 is selected not only in a case where it is detected that the second index display area 51 in which the second index 50 is displayed is selected, but also in a case where it is detected that a selection area 52 set outside the second index display area 51 is selected. More specifically, the selection area 52 is provided for each of the second indices 50. An area obtained by dividing the selection area 52 for each of the second indices 50 in the vertical direction that is a direction intersecting the horizontal direction, which is the display direction of the second index 50, is referred to a divided selection area 53. In a case where the divided selection area 53 is selected, it is determined that the second index 50 corresponding to the divided selection area 53 is selected.

Figure 6:
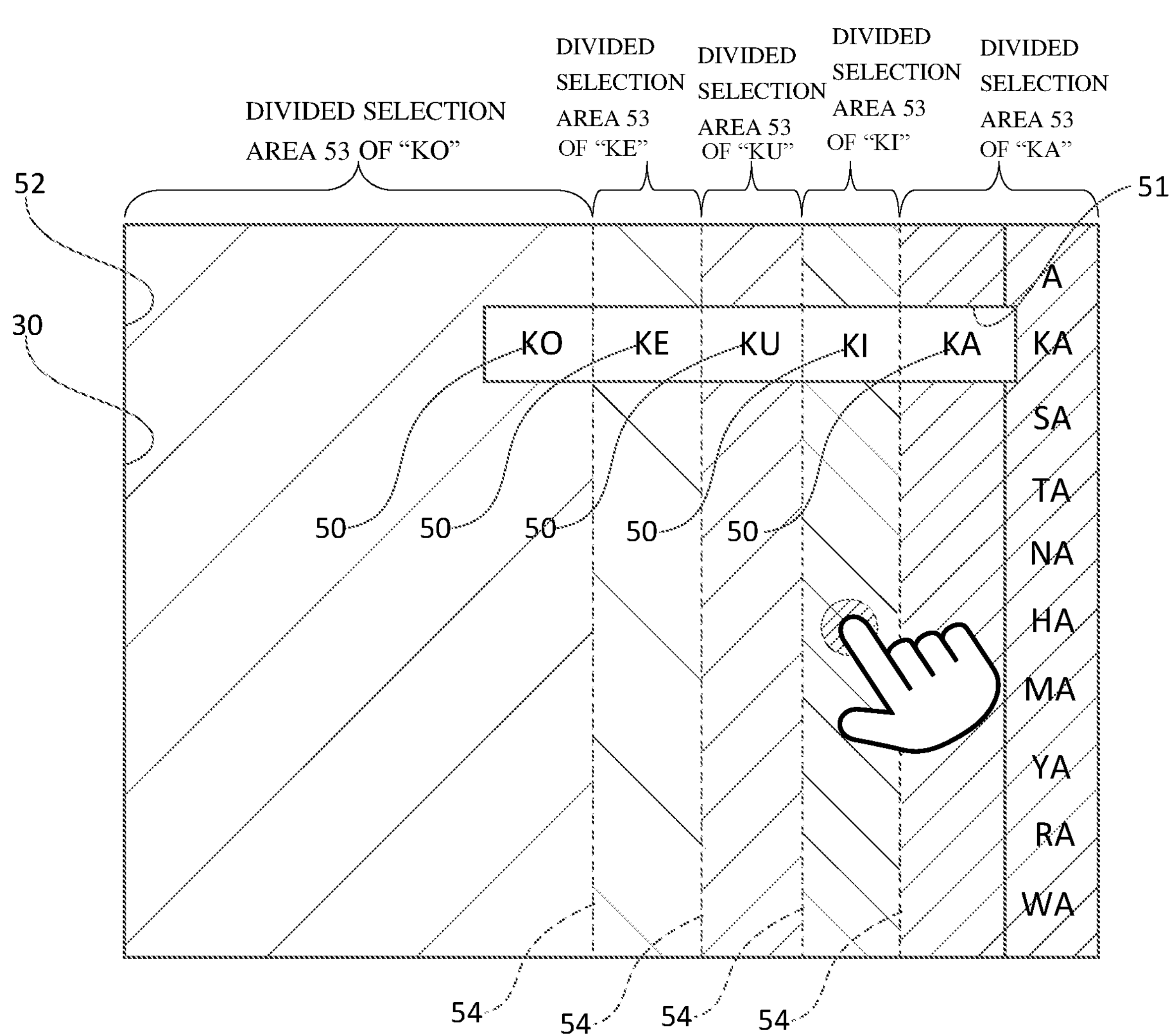
FIG. 6 shows a diagram illustrating a divided selection area according to the embodiment.

The divided selection area 53 will be described with reference to FIG. 6. FIG. 6 is a diagram illustrating the divided selection area 53. As illustrated in FIG. 6, in the display area 30 of the display unit 26, the display area 30 other than the second index display area 51 in which the second index 50 is displayed corresponds to the selection area 52. The selection area 52 is divided into divided selection areas 53 divided in the vertical direction by a boundary line 54 for each corresponding second index 50 in the second index display area 51. That is, even in a case where the user touches upper and lower areas of the second index display area 51 with the fingertip, the second index display area 51 can be selected. For example, even in a case where a lower area of the second index display area 51 where “KI” is displayed is touched by the fingertip as illustrated in FIG. 6, “KI” is selected. That is, in a case where the finger moves to a location outside the second index display area 51 where the second index 50 is displayed after the second index 50 is displayed, the displayed second index 50 generally disappears. The finger may often move to a location outside the second index display area 51. In such a case, it is necessary to select the first index 40 again, causing the poor user experience. According to the present embodiment, it is not necessary to select the first index 40 again. Furthermore, this configuration enables determination of the location touched by the user’s fingertip based on only the coordinates of the horizontal axis of the display area in the display unit 26, and the processing load can be reduced as compared with the determination including the coordinates of the vertical axis.

Figure 7:
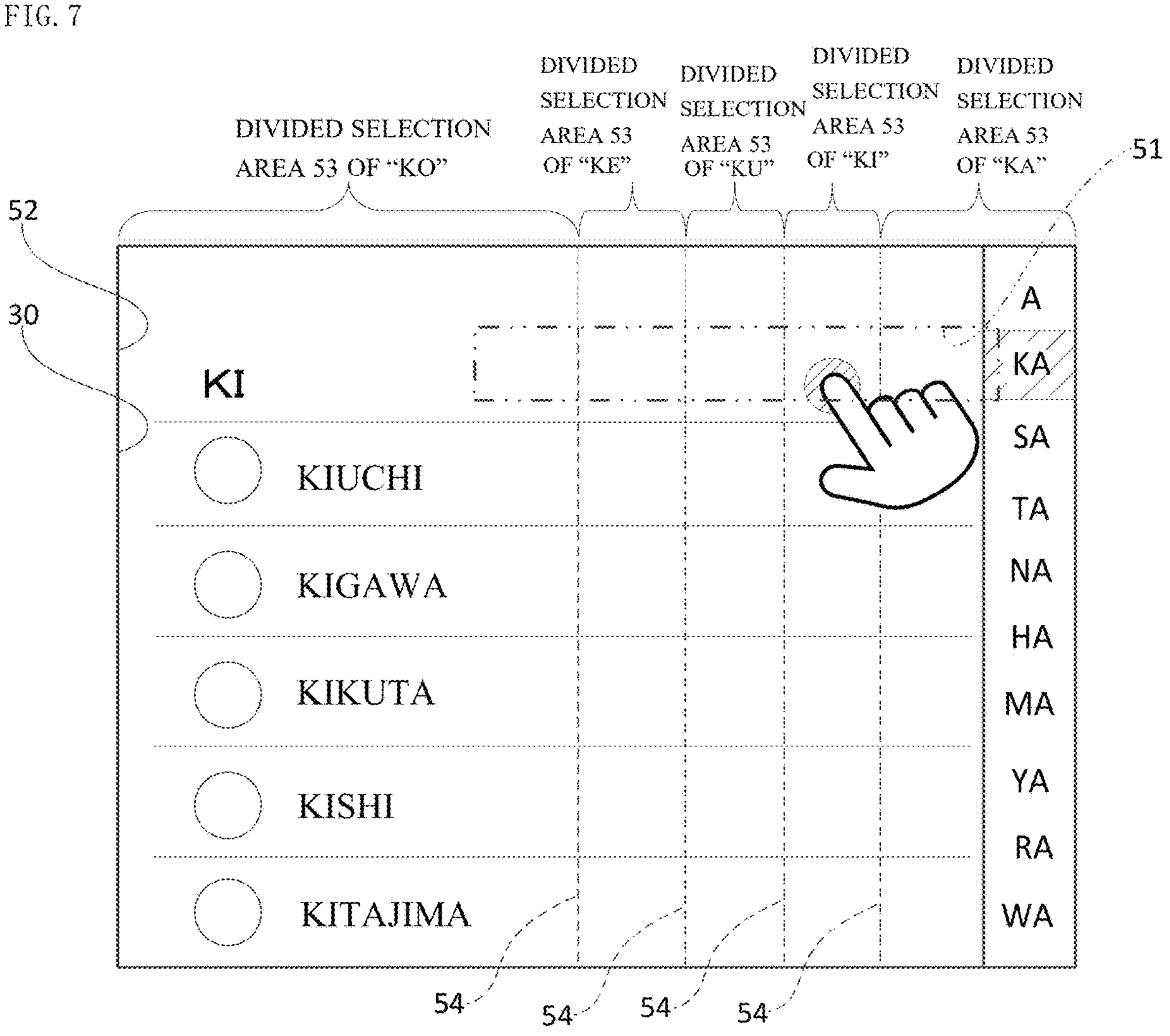
FIG. 7 shows a diagram illustrating selection of the divided selection area according to the embodiment.

The CPU 21 of the image forming device 20 determines that, even before the second index 50 is displayed, the second index 50 is selected in a case where an area in which such a second index 50 is to be displayed is selected. That is, as illustrated in FIG. 7, when “KA” is selected from the first indices 40, even before the predetermined condition for displaying the second index 50 is satisfied, for example, even before the second index 50 is displayed, i.e. the first index 40 is long-pressed, it is determined that the second index 50 corresponding to the location touched by the user’s fingertip is selected, and the destination information to the second index 50 is displayed. In the example of FIG. 7, the second index 50 is not displayed yet, but since the divided selection area 53 corresponding to “KI” among the second indices 50 is touched, it is considered that “KI” is selected from the second indices 50.

Selection for second indices 50 at both ends out of the second indices 50 enables detection of an area up to ends of display areas facing divided selection areas 53 corresponding to other adjacent second indices 50 as corresponding divided selection areas 53, not only the areas above and below the second index display area 51. Specifically, as illustrated in FIG. 6, “KA”, the second index 50 at the right end out of the second indices 50, has a corresponding divided selection area 53 as an area up to an end of a display area facing the divided selection area 53 corresponding to “KI”, the second index 50 adjacent from the right end of the display area 30 of the display unit 26. Furthermore, “KO”, the second index 50 at the left end out of the second indices 50, has a corresponding divided selection area 53 as an area up to an end of a display area facing the divided selection area 53 corresponding to “KE”, the second index 50 adjacent from the left end of the display area 30 of the display unit 26. That is, second indices 50 at both ends out of the second indices 50 have wider divided selection areas 53 than the other second indices 50.

That is, even in a case where the finger moves to a location outside the second index display area 51 where the second index is displayed after the second index is displayed, the displayed second index is maintained as it is.

Figure 8:
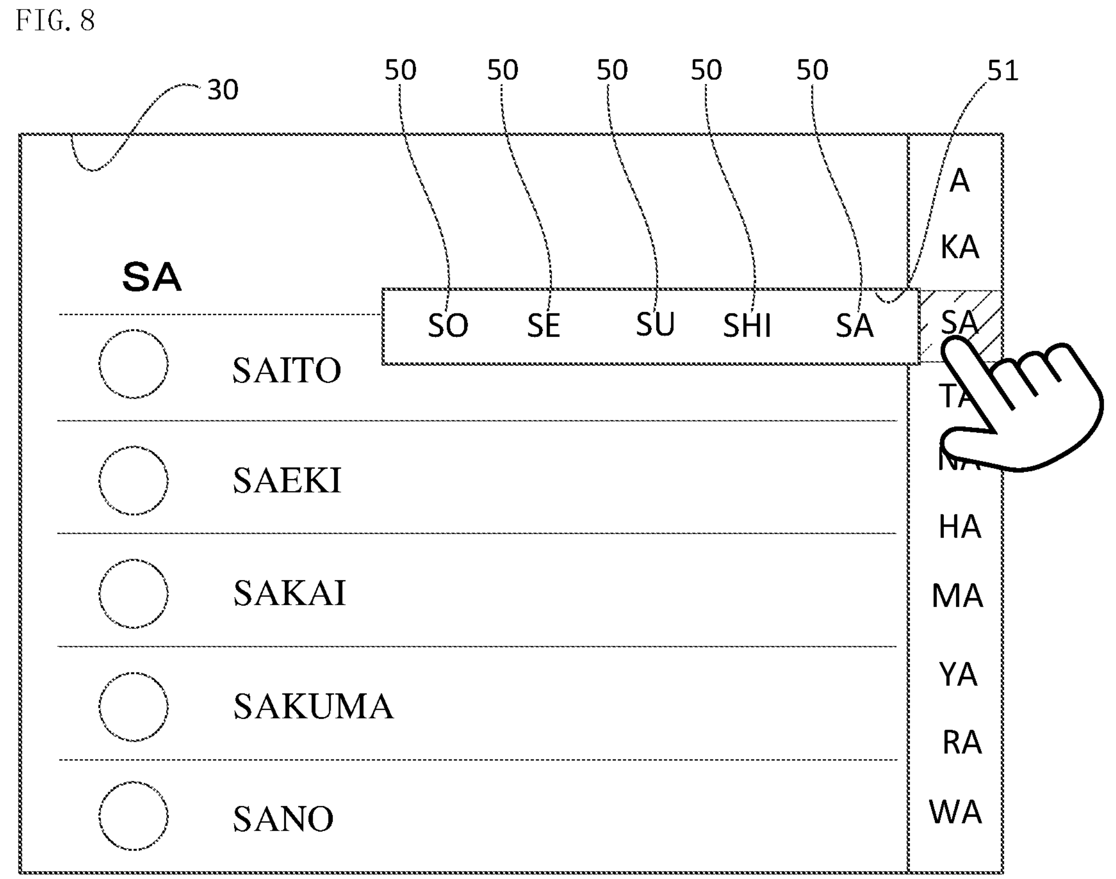
FIG. 8 shows a diagram illustrating one display example of a second index according to the embodiment.

The CPU 21 of the image forming device 20 displays, in a case where another first index 40 is displayed after the second indices 50 are displayed, second indices 50 corresponding to another first index 40 regardless of the predetermined condition. That is, in a case where the user slides the finger downward from the state in which the second indices 50 are displayed by long-pressing the first index 40 “KA” as illustrated in FIG. 4 and selects “SA” as another first index 40, the second indices 50, “SA”, “SHI”, “SU”, “SE” and “SO”, corresponding to the first index 40 “SA” are displayed even without satisfying long press that is the predetermined condition, as illustrated in FIG. 8. Accordingly, even in a case where the first index 40 is selected again, the second index 50 is displayed without waiting until the predetermined condition is satisfied. Furthermore, the invention is not limited to a case where second indices 50 corresponding to another first index 40 are displayed regardless of the predetermined condition in a case where another first index 40 is displayed after the second indices 50 are displayed. Once the second indices 50 are displayed, even if the user slides the finger to another first index 40, the displayed second index 50 may be maintained and the second indices 50 corresponding to the first index 40 to which the user's finger moves may not be displayed.

Figure 9:
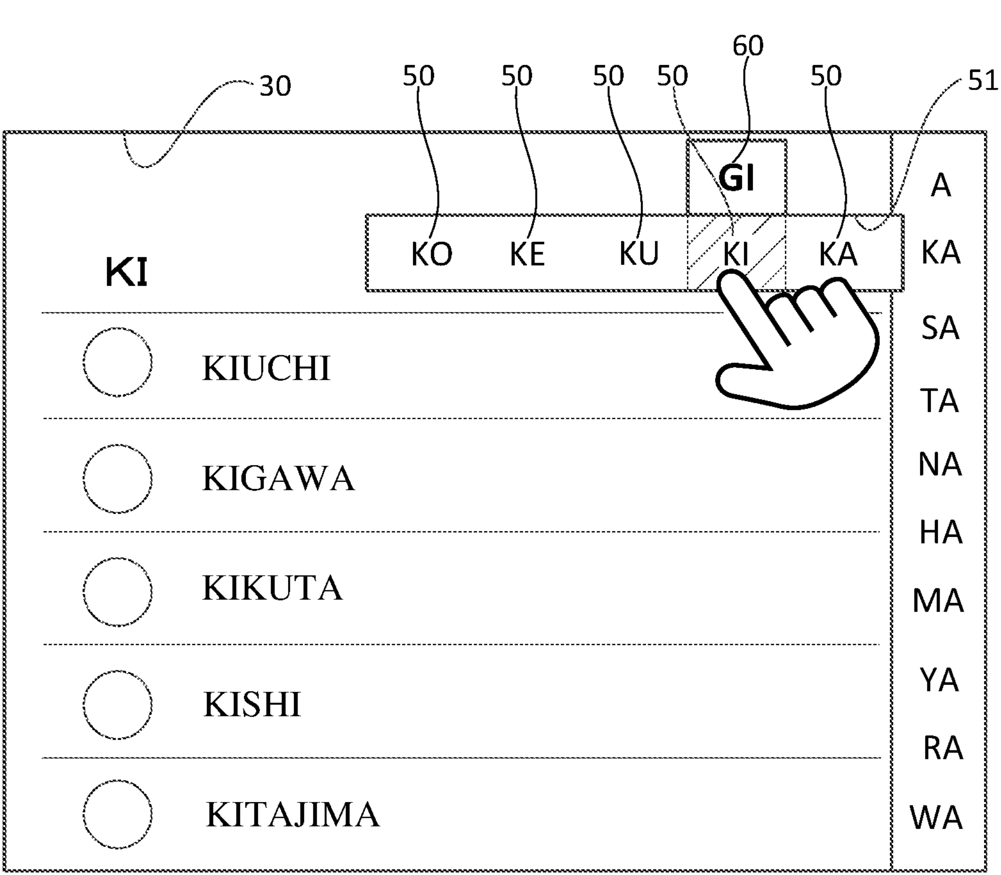
FIG. 9 shows a diagram illustrating one display example of a third index according to the embodiment.

The CPU 21 of the image forming device 20 displays a third index 60 associated with the second index 50, which is selected among the second indices 50, in any one or both of upward and downward directions of the selected second index 50. In the present embodiment, the third index 60 is, for example, a character with dakuten (voiced sound) or handakuten (devoiced sound) for the second index 50. For example, as illustrated in FIG. 9, in a case where "KI" is selected among the second indices 50, "GI", which is a voiced sound for "KI", is displayed as the third index 60 on the upper side of "KI". The user slides the finger upward from the state in which "KI" is selected to select "GI". The third index 60 "GI" may be displayed on the lower side of the second index 50. In a case where the second index 50 for which the third index 60 is not registered is selected, the third index 60 is not displayed. In a case where the second index 50 has the third indices 60, for example, in a case where the second index 50 is "HA", "BA" which is a voiced sound for "HA" is displayed on the upper side and "PA" which is a devoiced sound for "HA" is displayed on the lower side as the third index 60. By accessing the destination information via the third index 60, it is easier to access the destination information desired by the user than accessing the destination information via the second index 50. The CPU 21 of the image forming device 20 may display the third index 60 in any one or both of upward and downward directions of the second index 50, in a case where the selection for the second index 50 is held for a predetermined time, that is, the second index 50 is long-pressed. Displaying the third index 60 not indented by the user can be prevented under the condition of long press for the third index 60.

The disclosure is not limited to the embodiment above, and various modifications and applications can be made without departing from the gist of the disclosure.

Although not illustrated, the predetermined condition for displaying the second indices 50 may be selecting one of the first indices 40 and then sliding to the second index display area 51 in which the second indices 50 are displayed. Specifically, the second indices 50 may be displayed by the user sliding the finger selecting one of the first indices 40 toward the second index display area 51. The user's sliding can prevent the second indices 50 from being unintentionally displayed. It is also possible to display the second indices 50 more quickly than when the first index 40 is long-pressed as described above.

Figure 10:
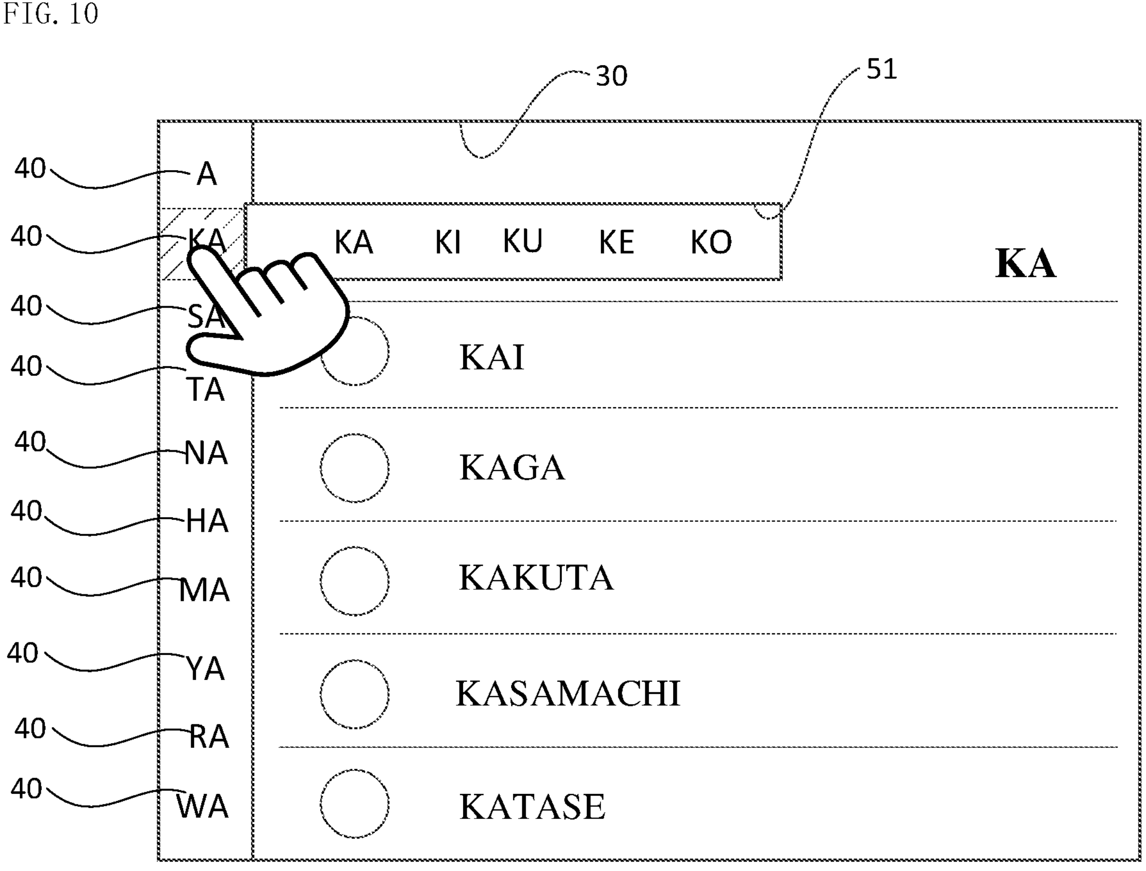
FIG. 10 shows a diagram illustrating another example of display on the display unit of the image forming device according to the embodiment.

As illustrated in FIG. 10, plural first indices 40 may be displayed at the left end of the display area 30 of the display unit 26. In this case, the second indices 50 are displayed in a straight line rightward from the first index 40. The user may make it selectable whether to display the first index 40 at the right end of the display area 30 and the second indices 50 to the left of the first index 40, or alternatively, display the first index 40 at the left end of the display area 30 and the second indices 50 to the right of the first index 40. Display is made according to user's preference. In particular, it is possible to select to display the first index 40 at the right end in a case where the user is right-handed and select to display the first index 40 at the left end in a case where the user is left-handed so as not to hide the display area 30 in which the destination information is displayed by the operating finger.

The selection of whether to display the second indices 50 on the left or right side of the display area 30 may be determined by the language setting of the image forming device 20. That is, in a case where a right-to-left (RTL) language is set, the second indices 50 may be displayed at the left end of the display area 30. Accordingly, the second indices 50 are displayed in a direction easy for the user to read.

In the present embodiment above, the first index 40 is displayed at the right or left end of the display area 30 of the display unit 26 in the vertical direction, and the second indices 50 are displayed in the horizontal direction of the display area 30 of the display unit 26, but the invention is not limited thereto. For example, although not illustrated, the first index 40 may be displayed in the horizontal direction at the upper or lower end of the display area 30 of the display unit 26, and the second indices 50 may be displayed in the vertical direction.

Figure 11:
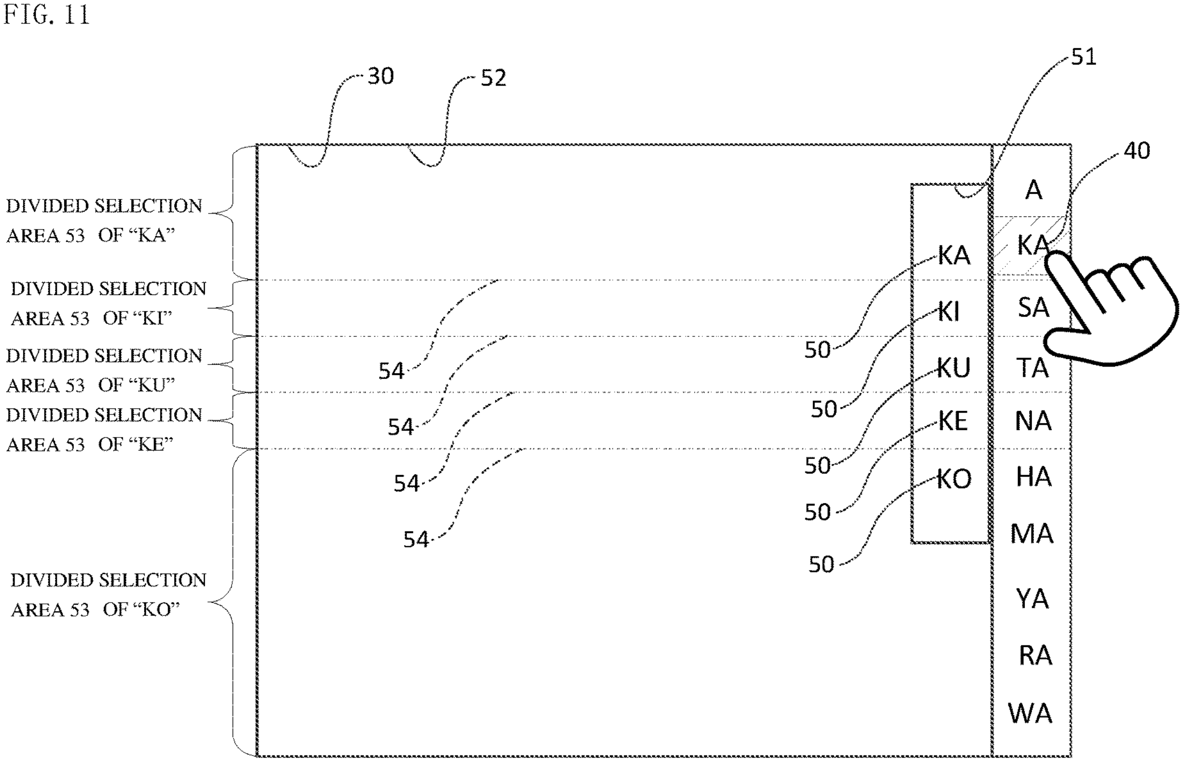
FIG. 11 shows a diagram illustrating another example of display on the display unit of the image forming device according to the embodiment.

In the present embodiment above, the first index 40 is displayed in vertical direction of the display area 30 of the display unit 26, and the second indices 50 are displayed in the horizontal direction of the display area 30 of the display unit 26, intersecting the vertical direction, but the invention is not limited thereto. For example, as illustrated in FIG. 11, the first index 40 and the second indices 50 may be displayed in parallel. Specifically, in a case where "KA" is selected among the first indices 40 displayed in the vertical direction, each of the second indices 50, "KA", "KI", "KU", "KE" and "KO" corresponding to the first index 40 "KA" is displayed in the vertical direction in parallel with the first index 40 on the left side of the first index 40. In a case where the first index 40 and the second indices 50 are displayed in parallel, an area obtained by dividing the selection area 52 for each of the second indices 50 in the horizontal direction that is a direction intersecting the vertical direction, which is the display direction of the second index 50, is referred to a divided selection area 53. Further, in a case where the first index 40 may be displayed in the horizontal direction at the upper or lower end of the display area of the display unit 26, the second indices 50 are displayed in the vertical direction.

Figure 12:
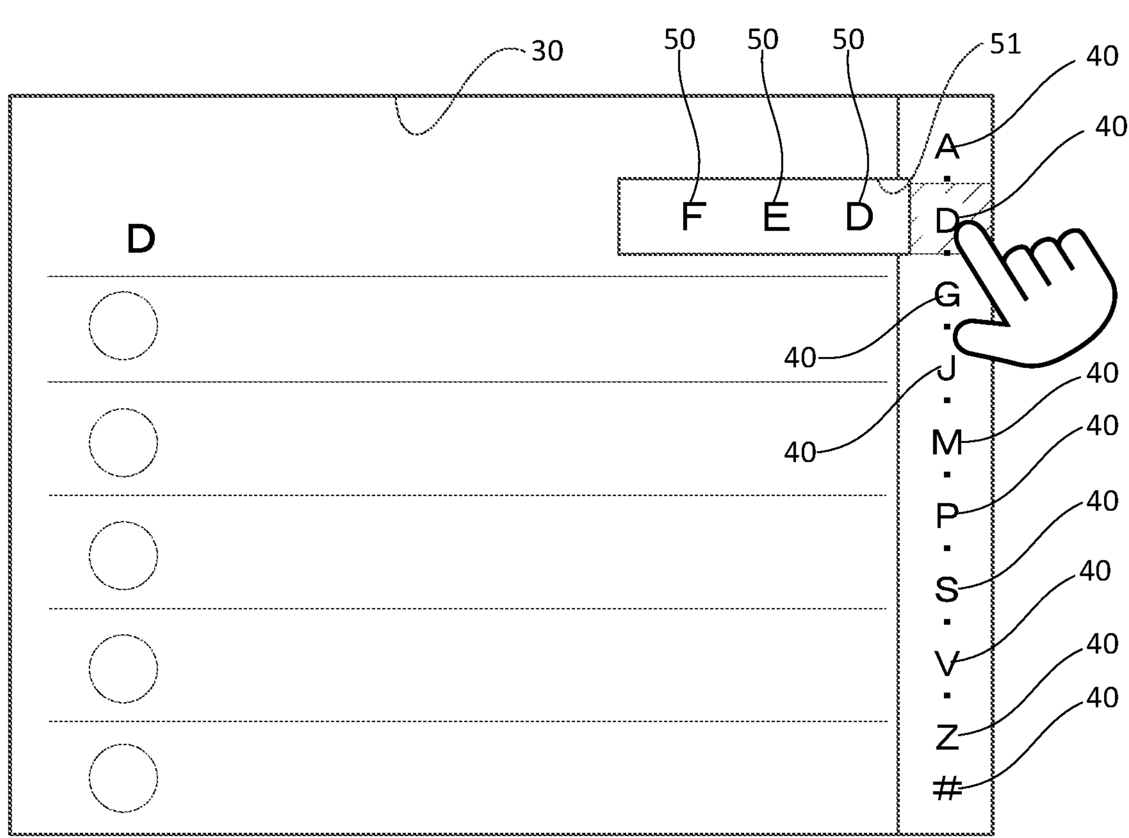
FIG. 12 shows a diagram illustrating another example of display on the display unit of the image forming device according to the embodiment.

As illustrated in FIG. 12, the first indices 40 and the second indices may be alphabets. In this case, if all the alphabets are displayed in the vertical direction of the display area 30, the alphabets become too small, and thus are omitted at predetermined intervals and displayed as the first indices 40. Then, the omitted indices are displayed as the second indices 50. For example, as illustrated in FIG. 12, the first indices 40 are "A", "D", "G", "J", "M", "P", "S", "V" and "Z", and the second indices 50 are "D", "E" and "F", characters between the first indices "D" and "G". Furthermore, in a case where the first indices 40 and the second indices are alphabets, a character with an accent symbol may be displayed as the third index 60. Alphabets displayed as the first indices 40 may be set by the user from among 26 alphabets.

Although not illustrated, the first indices 40 and the second indices 50 may be other than characters on the Japanese syllabary chart or alphabets, for example, numbers or symbols.

Furthermore, in addition to a case where the user touches and operates the display area 30 of the display unit 26 with a fingertip, the user may perform an operation with, for example, a line-of-sight, gesture or mouse.

Figure 13:
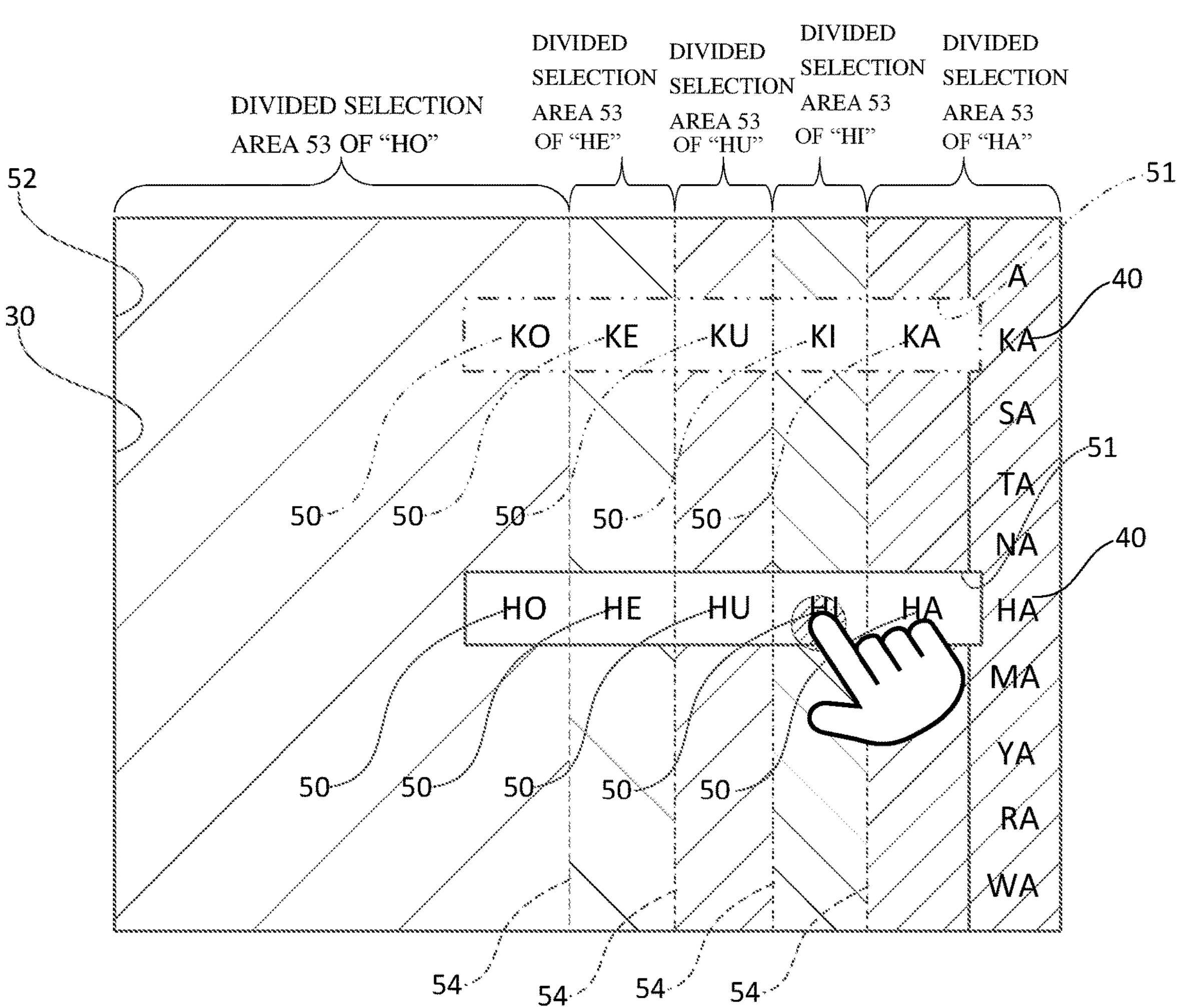
FIG. 13 shows a diagram illustrating another display example of the second index according to the embodiment.

In the present embodiment above, in a case where the second indices 50 are displayed after the first index 40 is selected and the divided selection area 53 other than the second index display area 51 is selected, the display of the second indices is maintained as it is, and it is determined that the second index 50 corresponding to the selected divided selection area 53 is selected among the displayed second indices 50 (see FIG. 6), but the invention is not limited thereto. In a case where the divided selection area 53 other than the second index display area 51 is selected, the display of the displayed second index 50 is switched to the display of the second index 50 corresponding to the first index 40 at the selected coordinates on the vertical axis of the display area 30 of the display unit 26. Then, it may be determined that the second index 50, displayed by switching, is selected. Specifically, as illustrated in FIG. 13, in a case where the user moves the finger from the state in which the second indices 50, "KA", "KI", "KU", "KE" and "KO", corresponding to the first index 40 "KA" are displayed to select the second index display area 51 corresponding to another first index 40, for example, "HA", the displayed second indices 50, "KA", "KI", "KU", "KE" and "KO", corresponding to the first index 40 "KA" disappear, and the second indices 50, "HA", "HI", "HU", "HE" and "HO", corresponding to the first index 40 "HA" are displayed. Then, it is determined that the divided selection area 53, in this example, the second index 50 "HI" is selected. In the example illustrated in FIG. 6, "KI" is selected among the second indices 50, but in the example illustrated in FIG. 13, "HI" is selected. That is, in a case where the divided selection area 53 other than the second index display area 51 is selected after the second indices 50 are displayed and the selected divided selection area 53 is the second index display area 51 of the second indices 40 corresponding to another first index 40, it is determined that the second index 50 corresponding to another first index 40 is selected. The first index 40 which is selected among the first indices 40 is determined by coordinates on the vertical axis of the display area 30 of the display unit 26.

In the embodiments above, the aspect in which the program is stored (installed) in advance in the ROM or the storage has been described, but the invention is not limited thereto. The program may be provided in a form of being recorded in a recording medium such as a compact disk read only memory (CD-ROM), a digital versatile disk read only memory (DVD-ROM), or a universal serial bus (USB) memory. The program may be downloaded from an external device via a network.

Furthermore, in the embodiments above, the processor refers to a processor in a broad sense, and includes a general-purpose processor (for example, central processing unit [CPU]) or a dedicated processor (for example, graphics processing unit [GPU], application specific integrated circuit [ASIC], field programmable gate array [FPGA] or programmable logic device).

The operation of the processor in the embodiment above may be performed not only by one processor but also by multiple processors existing at physically separated positions in cooperation. The order of each operation of the processor is not limited to the order described in each embodiment described above, and may be appropriately changed.

The disclosure of Japanese Patent Application No. 2021-153035 filed on Sep. 21, 2021 is incorporated herein by reference.

All documents, patent applications, and technical standards described in this specification are incorporated herein by reference to the same extent as if each individual document, patent application, and technical standard were specifically and individually indicated to be incorporated by reference.

The invention claimed is:

1. An information processing device, comprising:

a processor, wherein the processor is configured to:

display a plurality of first indices of a database stored in a storage unit, in a first direction of a display area of a display unit;

display, upon detecting a user's selection operation for a first index, a plurality of second indices, corresponding to the first index, in a straight line in a second direction intersecting or parallel to the first index;

determine that a second index is selected in a case in which it is detected that a second index display area displaying the second index has been selected, and also in a case in which it is detected that a selection area set other than the second index display area has been selected; and determine that, even before the second index is displayed, the second index is selected in a case in which the second index display area, in which the second index is to be displayed, is selected.

2. The information processing device according to claim 1, wherein the processor is further configured to:

provide the selection area for each of the plurality of second indices.

3. The information processing device according to claim 2, wherein the processor is further configured to:

display the plurality of second indices in a predetermined order starting from a first index side.

4. The information processing device according to claim 1, wherein the processor is further configured to:

determine that, in a case in which a divided selection area has been selected, the second index corresponding to the divided selection area is selected, the divided selection area being an area into which the selection area is divided in a direction intersecting the second direction for each of the second indices.

5. The information processing device according to claim 4, wherein selection for second indices at both ends among the plurality of second indices enables detection of an area up to ends of display areas facing divided selection areas corresponding to other adjacent second indices as corresponding divided selection areas.

6. The information processing device according to claim 1, wherein the processor is further configured to:

be selectable whether to display the first index at a right end of the display area and display the second indices to the left of the first index, or alternatively, display the first index at a left end of the display area and display the second indices to the right of the first index.

7. The information processing device according to claim 1, wherein the processor is further configured to:

display a third index associated with the second index in any one or both of directions intersecting the second direction of the second index in a state in which the second index is selected.

8. The information processing device according to claim 1, wherein the processor is further configured to:

display a third index associated with the second index in any one or both of directions intersecting the second direction of the second index in a case in which selection of the second index is held for a predetermined time.

9. The information processing device according to claim 1, wherein the database is an address book in which destination information is registered.

10. The information processing device according to claim 1, wherein:

the first index is a character in a sequence "A" of the Japanese syllabary chart, and the second index is a character in a row of the Japanese syllabary chart, corresponding to the character previously selected from the sequence "A".

11. An information processing device, comprising:

a processor, the processor being configured to:

display a plurality of first indices of a database stored in a storage unit, in a first direction of a display area of a display unit;

display, upon detecting a user's selection operation for a first index, a plurality of second indices, corresponding to the first index, in a straight line in a second direction intersecting or parallel to the first index;

determine that a second index is selected in a case in which it is detected that a second index display area displaying the second index has been selected, and also in a case in which it is detected that a selection area set other than the second index display area has been selected;

display the second index in a case in which a predetermined condition is satisfied; and display, in a case in which another first index is selected after the second indices are displayed, second indices corresponding to the other first index regardless of the predetermined condition.

12. The information processing device according to claim 11, wherein the predetermined condition is that selection of one of the first indices is held for a predetermined time.

13. The information processing device according to claim 11, wherein the predetermined condition is selecting one of the first indices and then sliding to the second index display area in which the second indices are displayed.

14. A non-transitory computer-readable storage medium storing a program executable by a computer to perform processing, the processing comprising:

displaying a plurality of first indices of a database stored in a storage unit, in a first direction of a display area of a display unit;

displaying, upon detecting a user's selection operation for a first index, a plurality of second indices, corresponding to the first index, in a straight line in a second direction intersecting or parallel to the first index;

determining that a second index is selected in a case in which it is detected that a second index display area displaying the second index has been selected, and also in a case in which it is detected that a selection area set other than the second index display area has been selected; and determining that, even before the second index is displayed, the second index is selected in a case in which the second index display area, in which the second index is to be displayed, is selected.

* * * * *